US012811159B2

(12) United States Patent
Lee et al.

(10) Patent No.: US 12,811,159 B2
(45) Date of Patent: Nov. 24, 2026

(54) ELECTRODE WITH 3-DIMENSIONAL STRUCTURE, ANODE FOR SOLID OXIDE FUEL CELL AND SOLID OXIDE FUEL CELL

(71) Applicants: KOREA INSTITUTE OF SCIENCE AND TECHNOLOGY, Seoul (KR); KOREA ADVANCED INSTITUTE OF SCIENCE AND TECHNOLOGY, Daejeon (KR)

(72) Inventors: Seung Yong Lee, Seoul (KR); Hyoungchul Kim, Seoul (KR); Jong Min Kim, Seoul (KR); Yeon Sik Jung, Daejeon (KR)

(73) Assignees: Korea Institute of Science and Technology, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 672 days.

(21) Appl. No.: 18/346,208

(22) Filed: Jul. 1, 2023

(65) Prior Publication Data

US 2024/0194894 A1 Jun. 13, 2024

(30) Foreign Application Priority Data

Jul. 4, 2022 (KR) ........................ 10-2022-0082043

(51) Int. Cl.
*H01M 8/1213* (2016.01)
*H01M 4/86* (2006.01)
(Continued)

(52) U.S. Cl.
CPC ....... *H01M 4/8626* (2013.01); *H01M 4/8621* (2013.01); *H01M 4/8657* (2013.01); *H01M 4/8803* (2013.01); *H01M 4/8825* (2013.01); *H01M 8/1213* (2013.01); *H01M 8/126* (2013.01); *H01M 2004/8684* (2013.01); *H01M 2008/1293* (2013.01)

(58) Field of Classification Search
None
See application file for complete search history.

(56) References Cited

FOREIGN PATENT DOCUMENTS

JP 2009211953 A * 9/2009

OTHER PUBLICATIONS

J. M. Kim, A. Jo, K. A. Lee, H. J. Han, Y. J. Kim, H. Y. Kim, G. R. Lee, M. Kim, Y. Park, Y. S. Kang, J. Jung, K. H. Chae, E. Lee, H. C. Ham, H. Ju, Y. S. Jung, J. Y. Kim. Conformation-modulated three-dimensional electrocatalysts for high-performance fuel cell electrodes, Sci. Adv. 2021; 7: eabe9083, Jul. 21, 2021.*
(Continued)

*Primary Examiner* — Carlos Barcena
(74) *Attorney, Agent, or Firm* — NSIP Law

(57) ABSTRACT

Disclosed herein are an electrode with a three-dimensional structure comprising two or more layers of nanowire array layer in which first and second nanowires of different materials, and air gaps between the first nanowires and the second nanowires, are arranged side by side, in which nanowires in one layer are crossed by nanowires in an adjacent layer, a method of manufacturing the electrode, an anode for a solid oxide fuel cell having the structure described above, and a solid oxide fuel cell including the anode.

20 Claims, 7 Drawing Sheets

(51) Int. Cl.
*H01M 4/88* (2006.01)
*H01M 8/126* (2016.01)
*H01M 8/12* (2016.01)

(56) References Cited

OTHER PUBLICATIONS

Tsubomura, H., et al. "Dye sensitised zinc oxide: aqueous electrolyte: platinum photocell." Nature 261.5559 (1976): 402-403.
O'Regan, Brian, et al. "A Low-Cost, High-Efficiency Solar Cell Based on Dye-Sensitized Colloidal $TiO_2$ Films." Nature 353.6346 (1991): 737-740.
Timurkutluk, Bora, et al. "Engineering solid oxide fuel cell electrode microstructure by a micro-modeling tool based on estimation of TPB length." International Journal of Hydrogen Energy 46.24 (2021): 13298-13317.

* cited by examiner

ELECTRODE WITH 3-DIMENSIONAL STRUCTURE, ANODE FOR SOLID OXIDE FUEL CELL AND SOLID OXIDE FUEL CELL

CROSS REFERENCE TO RELATED APPLICATION

The present application claims priority to Korean Patent Application No. 10-2022-0082043, filed on Jul. 4, 2022, the entire contents of which is incorporated herein for all purposes by this reference.

BACKGROUND OF THE INVENTION

Field of the Invention

The present disclosure relates to an electrode with a three-dimensional structure, an anode for a solid oxide fuel cell employing the same, and a solid oxide fuel cell including the same.

Description of the Related Art

Recently, there has been active research on high-capacity, high-efficiency power generation technologies and eco-friendly energy technologies.

For example, there is development on a variety of electrochemical devices, such as a dye-sensitized solar cell, a fuel cell, a solid oxide fuel cell, a metal-air cell, a water electrolysis cell, an all-solid-state secondary cell, a semi-solid-state secondary cell, and a water-based secondary cell.

In the electrochemical device, chemical reactions occur at solid/liquid, solid/gas, and solid/solid interfaces. A surface area of the interface may also significantly influence performance of the electrochemical device, as is the case with the dye-sensitized solar cell, also known as Gratzel cell. The basic concept was introduced by Tsubomura and co-authors in the journal Nature in 1976, using a dye adsorbed on a flat ZnO disk electrode, the corresponding cell had a 1.5% efficiency for 563 nm monochromatized light and a photocurrent of less than 30 uA (a low efficiency of 1% or less by AM. 5 standards). In 1991, O'Regan and Gratzel designed a porous photoelectrode using $TiO_2$ nanoparticles to dramatically increase the surface area and adsorb dyes onto the porous photocathode, achieving an efficiency of 7%. Similar attempts have been made with solid oxide fuel cells.

This is essentially an attempt to widen the interface area by splitting the electrode or electrolyte material, which was in one piece into small pieces, spatially disturbing.

However, when implementing porous electrodes using nanoparticles, closed pores are formed due to the uncontrollable position of individual particles, and the path of ions or electrons on the electrode is complicated and deviates from the shortest path. In these reasons, performance cannot improve as much as the increased interface. This is because when using nanoparticles as building blocks, it is impossible to control the shape of pores or position of individual particles and only control the overall average properties based on randomness, so it is impossible to implement a structure with a three-dimensional interconnected pore structure and optimized paths for ions or electrons.

SUMMARY OF THE INVENTION

The present disclosure provides an electrode with a three-dimensional structure in which characteristics such as the size, position, shape, and density of the pores may be individually controlled, which has a three-dimensionally interconnected pore structure, and which has improved performance by maximizing the density of the two- or three-phase boundary (TPB) at which reactions occur, and provides an anode for a solid oxide fuel cell with the three-dimensional structure applied, and a solid oxide fuel cell including the anode.

An exemplary embodiment has made in an effort to solve the above objects by implementing an electrode structure having an optimized path for ions and electrons and having a pore structure in which a nanowire arrays, which is one dimension higher than a nanoparticle and have larger size to be individually controllable, are three-dimensionally interconnected with each other.

An exemplary embodiment provides an electrode with a three-dimensional structure including two or more layers of nanowire array layer in which first and second nanowires of different materials, and air gaps between the first nanowires and the second nanowires, are arranged side by side, in which nanowires in one layer are crossed by nanowires in an adjacent layer.

Another exemplary embodiment provide a method of manufacturing an electrode including: preparing a patterned substrate having a shape arranged with rectangular columns lying side by side; depositing a first material while tilting the patterned substrate at an inclined angle of 60° to 85° and depositing the first material on one edge of convex columns; depositing a second material by rotating the patterned substrate on which the first material is deposited by an angle of 180° and depositing the second material on the other edge of the convex columns; and attaching a flat plate to a portion on which the first material and the second material are deposited, and removing the patterned substrate to obtain a nanowire array layer in which the first nanowire composed of a first material, the second nanowire composed of a second material, and an air gap between the first nanowire and the second nanowire are arranged side by side.

Another exemplary embodiment provides an anode for a solid oxide fuel cell having the structure described above, in which the first nanowire includes a nickel-containing anode material and the second nanowire includes a solid oxide electrolyte material.

Still another embodiment provides a solid oxide fuel cell including the anode, a cathode, and a solid oxide electrolyte positioned between the anode and the cathode.

An electrode according to an embodiment is a porous three-dimensional nanostructure, in which all electrolyte materials are interconnected, all anode materials are interconnected, and all pores are interconnected.

The electrode is capable of controlling a size, a position, a shape, and density of individual pores, and has a three-dimensional connected pore structure, which maximizes density of TPB where reactions occur, thereby dramatically improving performance.

DETAILED DESCRIPTION OF THE INVENTION

Figure 1:
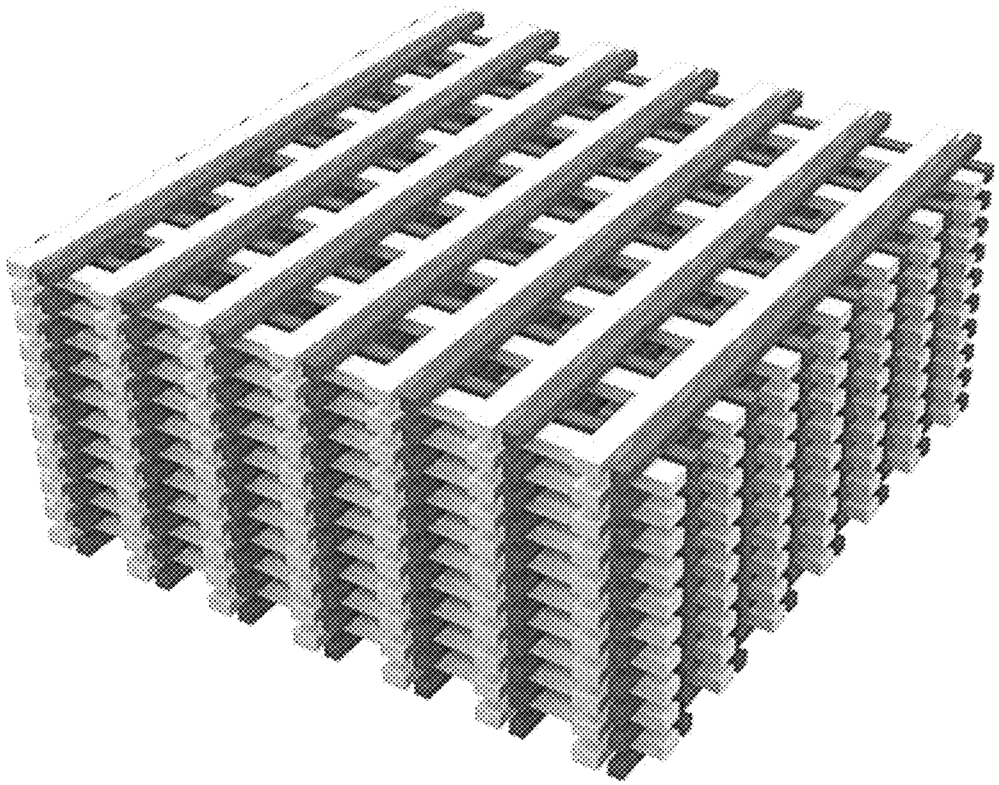
FIG. 1 is a schematic view illustrating a structure of an electrode, according to an embodiment.

Hereinafter, specific embodiments will be described in detail so that those with ordinary skill in the art may easily carry out the exemplary embodiments. However, the present disclosure may be implemented in various different ways and is not limited to the embodiments described herein.

The terms used herein are used to describe exemplary embodiments only and are not intended to limit the present disclosure. Singular expressions include plural expressions unless clearly described as different meanings in the context.

As used herein, "combination thereof" means a mixture of components, a laminate, a composite, a copolymer, an alloy, a blend, a reaction product, and the like.

As used herein, terms such as "includes," "comprises," or "has" are intended to specify the presence of an implemented feature, number, step, component, or combination thereof, and are to be understood as not precluding the possibility of the presence or addition of one or more other features, numbers, steps, components, or combinations thereof.

In the drawings, the thicknesses are shown to enlarge to clearly represent the various layers and areas, and the same reference numerals are used for similar portions throughout the specification. When one component such as a layer, a film, a region, or a plate is described as being positioned "above" or "on" another component, one component can be positioned "directly on" another component, and one component can also be positioned on another component with other components interposed therebetween. On the contrary, when one component is described as being positioned "directly on" another component, there is no component therebetween.

In addition, "layer" includes a shape formed on all surfaces as well as a shape formed on some surfaces when viewed in top plan view.

The average particle size may also be measured by methods well known to those skilled in the art, for example, by a particle size analyzer, or by optical microscopic images, such as transmission electron microscope or scanning electron microscope.

Alternatively, measurements can be made using dynamic light scattering and the data analyzed to count the number of particles for each particle size range, which can then be calculated to obtain an average particle diameter value. Unless otherwise defined, the average particle diameter may mean the diameter D50 of particles with a cumulative volume of 50 volume % in the particle size distribution.

As used herein, "or" is not to be interpreted in an exclusive sense, for example, "A or B" is to be interpreted to include A, B, A+B, etc.

Electrode

In an embodiment, a first nanowire and a second nanowire of different materials, and an air gap between the first nanowire and the second nanowire, are arranged adjacent to each other in one layer to form an interface and are arranged side by side with a predetermined regularity to provide an electrode with a three-dimensional structure in which two or more nanowire array layers are stacked.

Here, one layer is at a predetermined angle to an adjacent layer, and each of the three types of nanowires forms an interface with three types of nanowires in the neighboring layer.

The electrode may be a porous, three-dimensional structure with nanowire array layers stacked.

In one layer, the nanowires may be spaced apart from each other and arranged side by side, or may be arranged parallel to each other, for example at an angle of 160° to 180° or 170° to 180°, and may be described as generally parallel.

The nanowires may be arranged with a predetermined regularity in one layer. If the first nanowire is represented by the number 1, the second nanowire by the number 2, and the third nanowire by the number 3, then in one layer the nanowires may be arranged in various rules, for example, (1-2-3)-(1-2-3)-, (1-3-2)-, (1-3-2-3)-, and so on.

In addition, in the electrode with the three-dimensional structure, the nanowires in one layer are not parallel to, but rather at a predetermined angle to, the nanowires in an adjacent upper layer and/or the nanowires in an adjacent lower layer, and are cross-stacked, for example.

For example, the nanowires in one layer may form an angle of 45° to 90° with the nanowires in the adjacent upper layer and/or the adjacent lower layer, for example, an angle of 60° to 90°, 70° to 90°, 80° to 90°, or 90±5°. The electrode with such a three-dimensional structure may have no closed pores, but three-dimensional interconnected pores.

In addition, the electrode includes two types of nanowires having such a three-dimensional structure and composed of different materials.

Accordingly, the density of TPB (hereinafter referred to as triple-phase boundary), which is the contact point where gas or liquid simultaneously encounters two types of nanowires, is maximized, which can dramatically improve reactivity and performance of the electrode. This electrode also has an advantage in that the size, shape, and position of the pores are individually controlled rather than randomized. That is, it is possible and easy to control a size, a position, a shape, and a density of individual pores by adjusting a nanowire diameter, nanowire shape, an interval between nanowires, a pattern period, a number of stacked layers, etc. in the electrode. Accordingly, the electrode according to an embodiment is capable of appropriately adjusting the pore characteristics according to the cell to be applied or according to the desired properties, and is also capable of incorporating various materials, thereby being applicable to various electrochemical devices.

Here, a diameter of a nanowire refers to a size of the cross-section cut the nanowire in a direction perpendicular to a lengthwise direction of the nanowire.

The cross-section of the nanowire may be circular, elliptical, rectangular, amorphous, or the like, and the diameter of the nanowire may mean a diameter in case of a circular cross-section, a length of a long axis in case of an elliptical cross-section, a length of a long side in case of a square cross-section or may mean a length corresponding to a diameter in case of any shape of the cross-section. The nanowire according to an embodiment may have various diameters depending on the desired properties, but for example, each of the first nanowire and the second nanowire may have a diameter of 3 nm to 1000 nm, for example, may be 3 nm to 800 nm, 3 nm to 600 nm, 5 nm to 400 nm, 5 nm to 200 nm, 5 nm to 100 nm, or 10 nm to 50 nm.

The third nanowire is an air gap (hereinafter, referred to as an "air gap") between the first nanowire and the second nanowire, which may be formed by a gap between the first nanowires, a gap between the second nanowires, and/or a gap between the first and second nanowires, and may be in the form of a tunnel.

Within the three-dimensional electrode structure, the third nanowire, which serves as a pore, may be stacked at a predetermined angle to form the form of a three-dimensional interconnected pore. A diameter of the third nanowire may be representative of the size of the pore, and may be, for example, 0 nm to 10 μm, 1 nm to 5 μm, 5 nm to 1 μm, 5 nm to 800 nm, 10 nm to 500 nm, or 50 nm to 200 nm. The diameter of the third nanowire may be variable, even in one layer, and may vary or be constant from layer to layer, may become progressively larger or smaller, and may have periodicity.

The length of the nanowires may also be varied depending on the desired properties, for example, each length of the first nanowire, second nanowire, and third nanowire may be from hundreds of nanometers or millimeters, such as 0.5 mm to 50 cm, to tens of centimeters, for example, may be 0.5 mm to 50 cm, 1 mm to 30 cm, 5 mm to 10 cm, or 1 cm to 10 cm.

The stacking number of the nanowire array layers may be adjusted as needed, for example, from 2 to 500 layers, from 5 to 400 layers, from 10 to 300 layers, from 20 to 200 layers, from 2 to 100 layers, from 2 to 50, or the like.

The electrode with the three-dimensional structure includes the first nanowire and the second nanowire that contain different materials.

In the three-dimensional structure, the first nanowire and the second nanowire may be included in a random manner or in a regular manner, as needed.

In an example, in one nanowire array layer, the first nanowire and the second nanowire may be arranged in a repeating and regular manner.

That is, it is possible to be arranged in the form of (1-2-3)-(1-2-3)- or (1-3-2-3)-(1-3-2-3)- in one layer. When these layers are stacked, the density of TPB, in which gas or liquid is in contact with two types of nanowires at the same time within the electrode, may be maximized.

FIG. 1 is a view schematically illustrating the electrode structure for ease of understanding, in which 21 layers are stacked by arranging nanowires in a regular manner of (1-3-2-3')-(1-3-2-3')- (3': pores different in size from 3) in one layer and repeating the same pattern of arranging nanowires by turning the orientation to about 90° on top of the arranged nanowires in the one layer, according to an example.

Figure 2:
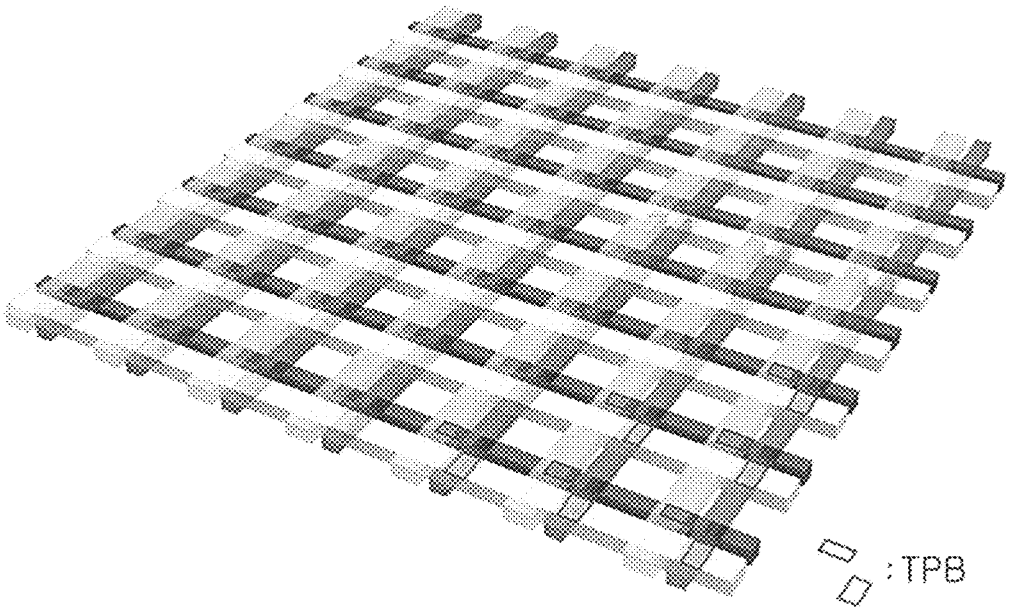
FIG. 2 is a view illustrating a position of TPB in the structure of the electrode according to an embodiment.

FIG. 2 is a view partially illustrating a position of the TPB in the three-dimensional structure as illustrated in FIG. 1 to provide a better understanding of the TPB, in which the TPB, which is the contact point where the first nanowire (green), the second nanowire (yellow), and the third nanowire (air) meet simultaneously, is represented by a small square.

In the electrode with the three-dimensional structure according to an embodiment, the density of TPB may have various values depending on the diameter or length of the nanowires, the interval between the nanowires, the stacking number of layers, and the like, but may be, for example, 100 $\mu m/\mu m^3$ or greater, 100 $\mu m/\mu m^3$ to 1000 $\mu m/\mu m^3$, or 100 $\mu m/\mu m^3$ to 500 $\mu m/\mu m^3$. This is a dramatically increased value compared to the existing electrodes, which have TPB densities of a few to tens of $\mu m/\mu m^3$.

The electrode according to an embodiment may have a high TPB density by having the three-dimensional structure of three-dimensionally connected pores without the closed pores, thereby improving reactivity of the electrode, which may improve performance of the cell. For more detailed information on the TPB density and the TPB density of existing electrodes, the article "International Journal of Hydrogen Energy 46 (2021) 13298-13317" may be referenced.

The electrode according to an example may have a kind of cascade structure in which five or more nanowire array layers are stacked (e.g., 5 to 200 layers), with increasingly larger intervals between the nanowires from a lower layer to an upper layer, thereby gradually increasing the size of the pores.

Depending on the type of electrochemical device, increasingly larger pores toward one direction in an electrode may be favorable to diffuse gases or liquids to facilitate to transfer reactants and discharge reaction products, which may be advantageous to device performance, and the electrode according to an embodiment may facilitate the implementation of such a structure. It is possible to manufacture the cascade structure by designing increasingly larger or smaller intervals between the nanowires while stacking nanowire array layers.

The first nanowire and the second nanowire include different materials.

It is possible to maximize reactivity of the electrode by introducing two types of materials into the three-dimensional nanostructures described above. For example, the first nanowire and the second nanowire may both include electrode material, but may include different types of electrode material. In another example, the first nanowire may include an electrode material and the second nanowire may include a material other than the electrode material. The electrode material refers to an anode material and a cathode material, which are the basic materials that enable the electrode to function. Materials other than the electrode material may be, for example, electrolyte materials, resins, binders, conductors, or additional components that add specific functions to the electrode.

In an example, the first nanowire may include an electrode material and the second nanowire may include an electrolyte material.

For example, the first nanowire and the second nanowire may each independently include a metal, a semi-metal, a metal oxide, a semi-metal oxide, a carbon material, a polymeric compound, a composite thereof, or a combination thereof.

In an example, the first nanowire may include a metal, a semi-metal, a metal oxide, a semi-metal oxide, or a combination thereof, and the second nanowire may include a carbon material. In another example, the first nanowire and the second nanowire may include a metal, a semi-metal, a metal oxide, a semi-metal oxide, or a combination thereof, but may include different types. Depending on the electrochemical device to be applied, various combinations may be designed.

The electrode described above may be applied, for example, to a fuel cell, a solid oxide fuel cell, a metal-air cell, a water electrolysis cell, an all-solid-state secondary cell, a semi-solid-state secondary cell, a water-based secondary cell, and the like.

Method of Manufacturing Electrode

An embodiment provides a method of manufacturing the electrode including: (i) preparing a patterned substrate having a shape arranged with rectangular columns lying side by side; (ii) depositing a first material while tilting the patterned substrate at an inclined angle of 60° to 85° and depositing the first material on one edge of convex columns; (iii) depositing a second material by rotating the patterned substrate on which the first material is deposited by an angle of 180° and depositing the second material on the other edge of the convex columns; and (iv) attaching a flat plate to a portion on which the first material and the second material are deposited, and removing the patterned substrate to obtain a nanowire array layer in which the first nanowire composed of a first material, the second nanowire composed of a second material, and an air gap between the first nanowire and the second nanowire are arranged side by side.

Figure 3:
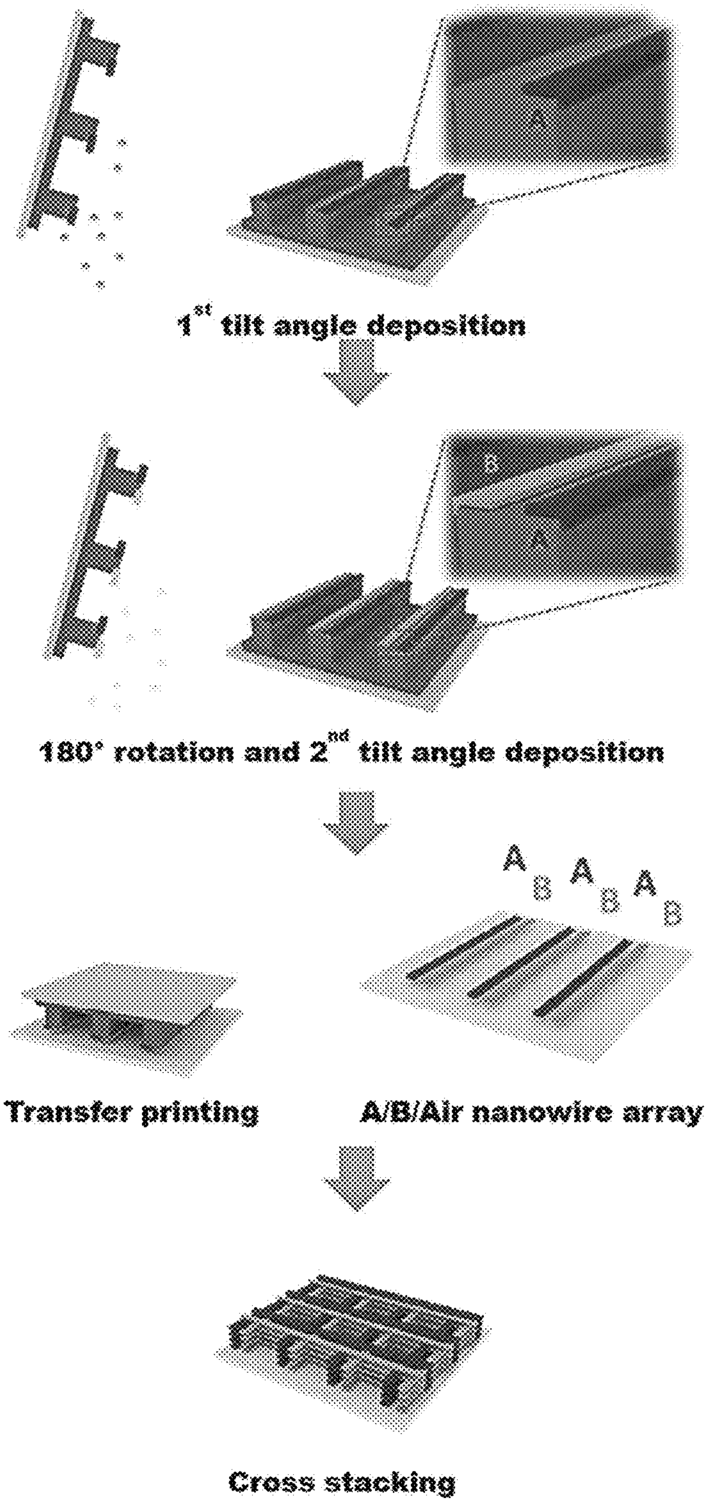
FIG. 3 is a view briefly illustrating a method of manufacturing the electrode according to an embodiment.

FIG. 3 is a view briefly illustrating the method of manufacturing the electrode according to one embodiment for ease of understanding. As illustrated in FIG. 3, a structure with the first nanowire, the third nanowire (pores), the second nanowire, and the third nanowire (pores of different sizes) arranged sequentially may be manufactured, and the order and arrangement of each nanowire may be adjusted accordingly.

In the patterned substrate, the rectangular columns, that is, a width of the convex columns, an interval between the columns, a length of the column, and the like, may be appropriately adjusted according to the desired properties of the nanowires.

The width of the convex column is a factor that affects the diameters of the first nanowires to the third nanowires that are manufactured, and may be, for example, 5 nm to 500 μm, 5 nm to 300 μm, 5 nm to 100 μm, 5 nm to 50 μm, 5 nm to 10 μm, 5 nm to 1 μm, 5 nm to 800 nm, 10 nm to 500 nm, 15 nm to 300 nm, or 50 nm to 200 nm. The interval between the convex columns is a factor that affects the diameter of the third nanowire composed of air and the like, and may be, for example, 5 nm to 500 μm, 5 nm to 300 μm, 5 nm in 100 μm, 5 nm to 50 μm, 5 nm to 10 μm, 5 nm to 1 μm, 5 nm to 800 nm, 10 nm to 500 nm, or 50 nm to 200 nm.

The length of the convex column is a factor that affects the lengths of the first nanowire to the third nanowire and may be from a few hundred nanometers to tens of centimeters, for example, 0.5 mm to 50 cm, 1 mm to 30 cm, 5 mm to 10 cm, or 1 cm to 10 cm.

In the patterned substrate, the convex columns may be arranged in a regular manner. When a distance from a point at which one convex column begins to a point at which the next convex column is called a period, the period of the convex column may be, for example, 6 nm to 15 μm, 6 nm to 10 μm, 6 nm to 5 μm, 6 nm to 1 μm, 10 nm to 800 nm, 20 nm to 500 nm, or 30 nm to 300 nm.

The patterned substrate may be composed of a polymeric material, for example, an acrylic resin.

The acrylic resin may include, for example, polybutyl (meth) acrylate, polypropyl (meth) acrylate, polyethyl (meth) acrylate, polymethyl (meth) acrylate, or a combination thereof. The use of the patterned substrate composed of the polymeric material may facilitate the patterned substrate manufacturing process, the deposition process, and the patterned substrate removal process.

A method of manufacturing the patterned substrate composed of a polymeric material may include coating a trench substrate having rectangular columns lying side by side with the polymeric material and then removing the polymeric material from the trench substrate using an adhesive tape or the like. In this method, the polymeric patterned substrate having an inverse shape of the trench substrate may be manufactured.

In the step of depositing the first material, the patterned substrate may be tilted at an inclined angle of 60° to 85° such that, in a position where the lengthwise direction of the convex columns is parallel to the floor, the convex columns incline and face the floor at an angle.

In case of depositing the first material in this state, the first material may be deposited in the form of nanowires on only one side edge of the convex column, as illustrated at the top drawing in FIG. 3.

Thereafter, the convex substrate is rotated 180° to deposit the second material, as illustrated in the second drawing from the top in FIG. 3, so that the second material is deposited on the other side edge of the convex column.

Therefore, a structure in which the first nanowires formed by depositing the first material and the second nanowires formed by depositing the second material are arranged alternately may be obtained.

After attaching a flat plate to a portion on which the first material and the second material are deposited, as illustrated in the third drawing from the top in FIG. 3, by removing the patterned substrate, a nanowire array layer in which the first nanowire, the second nanowire, and an air gap between the first nanowire and the second nanowire are arranged in a regular manner on the flat plate may be obtained.

Removing the patterned substrate may be accomplished, for example, by exposing the patterned substrate, which is composed of the polymeric material, to an organic solvent and/or vapors of the organic solvent.

The organic solvent may be, for example, acetone, heptane, toluene, or a combination thereof.

The first material and the second material may both be electrode materials, but may be different types of electrode materials. Alternatively, the first material may include the electrode material and the second material may include a material other than the electrode material. The electrode material refers to an anode material and a cathode material, which are the basic materials that enable the electrode to function. Materials other than the electrode material may be, for example, electrolyte materials, resins, binders, conductors, or additional components that add specific functions to the electrode. For an example, the first material may be an electrode material and the second material may be an electrolyte material.

The first material and the second material may be different from each other, and may each independently include a metal, a semi-metal, a metal oxide, a semi-metal oxide, a carbon material, a polymeric compound, a composite thereof, or a combination thereof. In an example, the first material may include a metal, a semi-metal, a metal oxide, a semi-metal oxide, or a combination thereof, and the second material may include a carbon material. In another example, the first material and the second material may include a metal, a semi-metal, a metal oxide, a semi-metal oxide, or a combination thereof, but may include different types. Depending on the electrochemical device to be applied, various combinations may be designed. For example, in case of a negative electrode for a solid oxide fuel cell to be described later, the first material may be a metal containing nickel, and the second material may be a solid electrolyte material containing a metal oxide, a semi-metal oxide, a composite thereof, or a combination thereof.

Meanwhile, as illustrated at the bottom drawing in FIG. 3, the method of manufacturing the electrode may further include (v) obtaining an electrode with a three-dimensional structure in which the nanowire array layer is stacked at least two layers (e.g., two to 500 layers) by cross-stacking the nanowire array layers, after obtaining the nanowire array layer. That is, when stacking the nanowire array layer, the nanowire array layer is rotated at an angle of, for example, 45° to 90° from the previous transfer direction, and the next layer is stacked. Therefore, the nanowires in one layer are not parallel to the nanowires in the adjacent layer, but rather at a predetermined angle.

According to this method, in the manufactured three-dimensional electrode structure, each nanowire may form very many interfaces, and all materials may be interconnected and all pores may be interconnected in three dimensions. Therefore, performance of the device may be dramatically improved by maximizing the interface where chemical reactions take place, and the size and position of the pores may be adjusted to achieve the desired properties.

In addition, the diameter of the third nanowire composed of air may be adjusted by adjusting the width of the convex column of the patterned substrate or the interval between the convex columns. When the nanowire array layer is stacked in this method, the cascade structure described above may also be manufactured by stacking the nanowire array layer in a structure with an increasingly larger diameter of the third nanowire.

Anode for Solid Oxide Fuel Cell

An embodiment provides an electrode for a solid oxide fuel cell (SOFC) with the electrode described above used. A fuel cell is a device that generates electricity by reacting a fuel such as hydrogen or natural gas with oxygen. Among the fuel cells, the SOFC is a fuel cell that uses a solid oxide as an electrolyte, and has been attracting attention as a key energy technology for the future because the SOFC is highly efficient, environmentally friendly, and highly safe. The SOFC includes a unit cell with a structure in which the anode, where the fuel gas such as hydrogen is supplied, and the cathode, where air or oxygen is supplied, are separated by a solid oxide electrolyte. Important factors in the SOFC are a supply of reaction gas, reactivity of gas at an electrode surface, and an emission of a reaction product, $H_2O$. In particular, in order to increase reactivity of oxygen and hydrogen at the electrode surface, techniques are being developed to maximize interfaces of electrode materials, and attempts are being made to introduce porous structures with nanopores into the electrode, for example. In addition, there is a problem of performance degradation at low temperature, such as a decrease in conductivity in the electrode, and thus low-temperature solid oxide fuel cell (LT-SOFC) without performance degradation at low temperature is being actively researched.

However, most of the nanostructures or porous structures proposed as the electrode for existing SOFC are based on technologies that control the average properties by controlling the size or shape of the nanoparticles or by controlling process variables, thus making it impossible to control the individual pores. In general, the pore properties are based on randomness. In contrast, the electrode according to an embodiment is capable of controlling characteristics such as the size, position, shape, and density of individual pores, and has a significantly higher density of TPB in which the reactive gas meets the electrode material, thereby maximizing electrode reactivity. In addition, the electrode according to an embodiment is very easy to drain water due to its three-dimensional connected pore structure, which is advantageous for being used as an electrode for the SOFC.

An embodiment provides an anode for a solid oxide fuel cell having the three-dimensional electrode structure described above, in which the first nanowire includes a nickel-containing anode material and the second nanowire includes a solid oxide electrolyte material. The anode has a very high density of contact point where the supplied reaction gas, hydrogen, and the anode material of the first nanowire and the solid oxide electrolyte of the second nanowire meet simultaneously, which can dramatically improve reactivity of the electrode, individually control the characteristics of the pores as needed, and facilitate water drainage to improve battery performance.

The anode material of the first nanowire may include a nickel metal, a nickel alloy, a nickel oxide, a composite of nickel and another metal, or a combination thereof.

The solid oxide electrolyte material of the second nanowire is an oxygen ion conductive material and may include, for example, ceria ($CeO_2$), Gd-doped ceria (CGO), Sm-doped ceria, Nd-doped ceria, zirconia ($ZrO_2$), yttria-stabilized zirconia (YSZ), bismuth oxide ($Bi_2O_3$), Er-doped bismuth oxide, Dy-doped bismuth oxide, W-doped bismuth oxide, lanthanum gallate ($LaGaO_3$), Sr, Mg-doped lanthanum gallate (LSGM), or a combination thereof.

The diameter and length of the first nanowire, the second nanowire, and the third nanowire, the staked number of nanowire array layers, the arrangement pattern of the nanowires, the stacking pattern, the TPB density, and the like are the same as described above, and therefore a detailed description is omitted.

The anode for the solid oxide fuel cell may also have a cascade structure. That is, the anode may have a structure in which five or more layers of nanowire arrays are stacked (e.g., five to 200 layers), and the spacing of the nanowires becomes gradually larger from a lower layer to an upper layer, i.e., the size of the pores becomes progressively larger. For example, an anode can have a structure in which the pores become progressively larger from a layer in contact with the solid oxide electrolyte to a layer on the opposite surface. In this case, hydrogen gas is more likely to penetrate the electrode, which increases reactivity of hydrogen and oxygen, and also facilitates water drainage, thereby improving performance of the SOFC.

In addition, as an example, the anode for the solid oxide fuel cell may have a structure in which the first nanowire, the second nanowire, and the third nanowire are arranged in a regular manner in one layer, such as (1-3-2-3')-(1-3-2-3')-, and these array layers are repeatedly stacked. In this case, the contact point where the hydrogen gas, the first nanowire, and the second nanowire all meet may be maximized and thus performance of the anode may be maximized.

Solid Oxide Fuel Cell

An embodiment provides a solid oxide fuel cell that includes the electrode described above. For example, provided herein is the solid oxide fuel cell including an anode, a cathode, and a solid oxide electrolyte positioned between the anode and the cathode, and in which at least one of the anode and the cathode has the electrode described above. The solid oxide fuel cell may individually adjust the size, position, shape, and density of the pores in the electrode according to the desired properties, and have high electrode reactivity due to the high density of TPB where the electrode material and gas are in contact with each other, and facilitate water drainage, thereby dramatically improving performance such as efficiency and lifetime of the battery.

The solid oxide fuel cell according to an embodiment may be a low temperature solid oxide fuel cell (LT-SOFC) that operates at a low temperature of 500° C. or less, and is thus expected to be applicable to real-life applications such as portable power source, and the like.

In an embodiment, provided is a solid oxide fuel cell having the three-dimensional electrode structure described above, in which the solid oxide fuel cell includes: an anode including the first nanowire that include a nickel-containing anode material, and the second nanowire that include a solid oxide electrolyte material; a cathode; and a solid oxide electrolyte disposed between the anode and said cathode.

Here, the cathode may selectively have the three-dimensional structure described above. For example, the cathode may have a three-dimensional structure in which the nanowire array layers, in which the nanowires are spaced apart and arranged side by side, are stacked in two or more layers, and the nanowires in one layer are crossed by the nanowires in an adjacent layer. The cathode may include only one type of nanowire, or may include two types of nanowires of different materials, such as the electrode described above.

The cathode may include a cathode material containing, for example, La—Mn oxide ($LaMnO_3$; LMO), Sr-doped lanthanum manganite (LSM), La—Sr—Co—Fe oxide (LSCF), La—Sr—Co oxide (LSCO), La—Sr—Fe oxide (LSFO), Ba—Sr—Co—Fe oxide (BSCF), or a combination thereof.

In case that the cathode has the three-dimensional structure of stacked nanowire array layers, the nanowires may include any of the cathode materials described above. Further, in case that the cathode includes two types of nanowires, each nanowire may include a different type of cathode material, or one nanowire may include a cathode material and the other may include a solid oxide electrolyte material.

In the solid oxide fuel cell described above, the solid oxide electrolyte positioned between the anode and the cathode to separate the anode and cathode may include, for example, ceria ($CeO_2$), Gd-doped ceria (CGO), Sm-doped ceria, Nd-doped ceria, yttria-stabilized zirconia (YSZ), bismuth oxide ($Bi_2O_3$), Er-doped bismuth oxide, Dy-doped bismuth oxide, W-doped bismuth oxide, lanthanum gallate ($LaGaO_3$), Sr, Mg-doped lanthanum gallate (LSGM), or a combination thereof.

The solid oxide electrolyte may be in the form of a film, or may be a nanowire structure.

In an example, the anode, the cathode, and the solid oxide electrolyte of the solid oxide fuel cell may each have a three-dimensional structure in which nanowire array layers, in which nanowires are spaced apart and arranged side by side, are stacked in two or more layers, and nanowires in one layer are crossed by nanowires in an adjacent layer. In this case, the pores of each anode, cathode, and solid oxide electrolyte may be individually adjusted according to the desired properties, which improves reactivity of the electrode and facilitates water drainage, thus improving performance of the battery.

In the solid oxide fuel cell described above, the anode and the cathode may each have a cascade structure. That is, each of the anode and the cathode may be a three-dimensional structure in which nanowire array layers are stacked in five or more layers, and the intervals between the nanowires become increasingly larger from a layer in contact with the solid oxide electrolyte to an opposite surface layer. In this case, the reactant, water, may be easily drained while favorably facilitating the introduction of the supplied gas, thereby improving performance of the solid oxide fuel cell.

Figure 4:
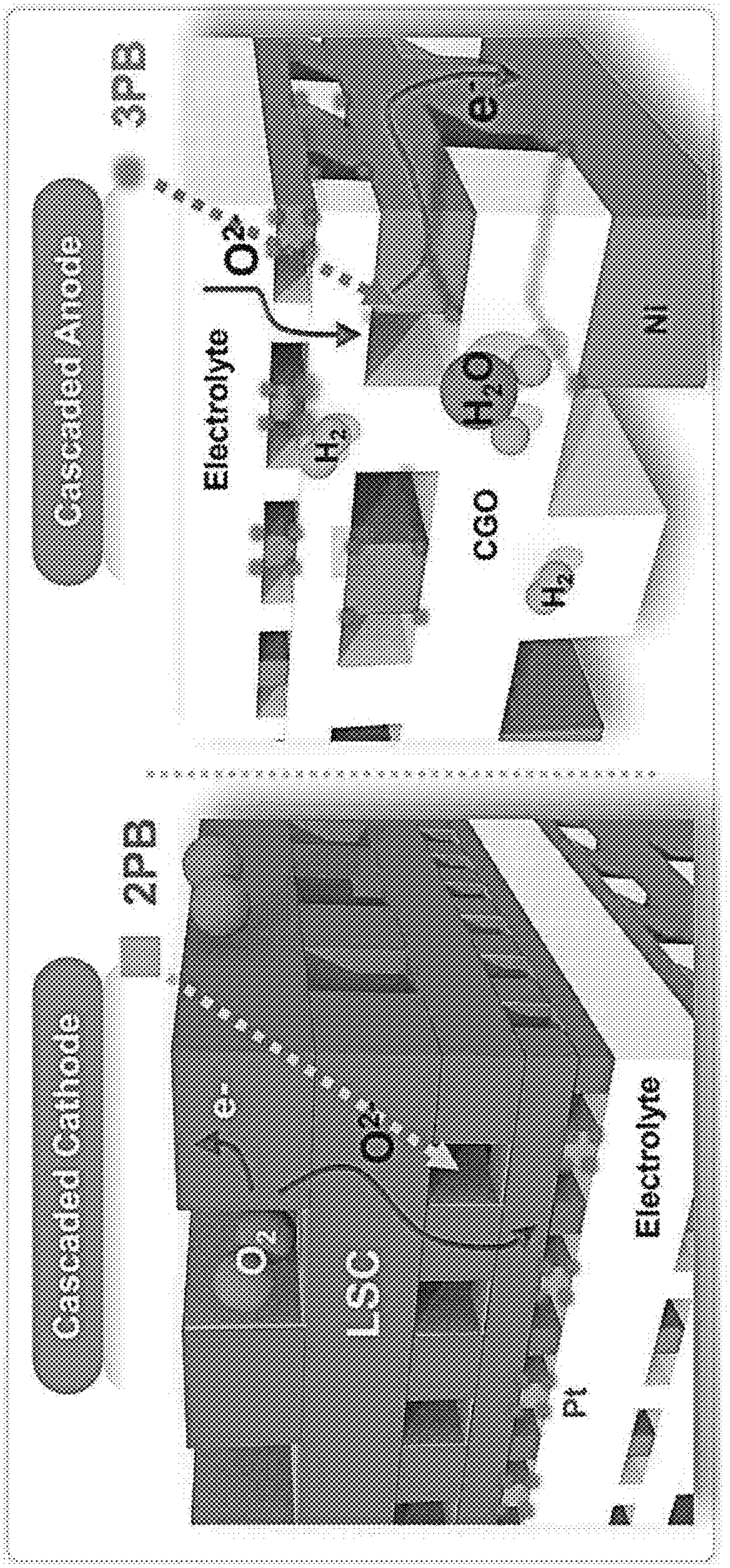
FIG. 4 is a schematic view illustrating a structure of a solid oxide fuel cell, according to an embodiment.

FIG. 4 is a view schematically illustrating a structure of a solid oxide fuel cell according to an example. In FIG. 4, both an anode and a cathode have a cascade structure. In FIG. 4, the cathode on the left has pores that increase in size from a layer in contact with the electrolyte at the bottom to a surface layer at the top. In FIG. 4, in the anode on the right, the third nanowire including two types of nanowires and air is arranged repeatedly, and the anode has a structure in which the pores become larger from a layer in contact with the electrolyte at the top to a surface layer at the bottom. In the cathode, oxygen gas is favorable to penetrate, and in the anode, hydrogen gas and oxygen gas supplied meet and react on the surface of the two types of nanowires, which is a very favorable structure to produce a battery. This structure may dramatically improve performance of the solid oxide fuel cell.

Hereinafter, comparative examples and examples of the present disclosure will be described. The examples described below are merely exemplary of the present disclosure and the present disclosure is not limited to the examples described below.

Example 1: Manufacturing Electrode

A trench substrate with a concave-convex surface in which straight columns with a width of 100 nm are arranged at intervals of 200 nm is prepared, and a top surface of the substrate is surface-treated with polydimethylsiloxane. Polymethylmethacrylate (PMMA) is spin-coated on top of the surface-treated substrate, and then adhesive tape is applied and peeled off to produce a PMMA thin film with an inverse structure of the concave-convex.

With the PMMA thin film as the substrate, the PMMA thin film is tilted with a lengthwise direction of the concave-convex as an axis. Depending on the shape and size of the concave-convex, the PMMA thin film is tilted at an inclined angle of 60° to 85°. First, Gd-doped ceria (CGO) is deposited on the PMMA thin film such that CGO is deposited on one side edge of the concave-convex mountain.

The substrate on which the CGO is deposited is then rotated by 180° and nickel metal Ni is secondarily deposited so that Ni is deposited on the other side edge of the concave-convex mountain. Therefore, a nanowire array of alternating CGO nanowires and Ni nanowires is prepared. The substrate is attached to a portion where the nanowires have been deposited, and the substrate is exposed to the vapor of the acetone and heptane mixture. After removing the adhesive tape to eliminate an adhesive force of the adhesive tape, the remaining PMMA is removed with an organic solvent, thereby obtaining CGO-Ni nanowire array arranged on the substrate. The width and interval of the nanowires may be controlled by adjusting the shape of the concave-convex in the trench substrate and the deposition conditions.

By repeating the transfer process described above 21 times, an electrode including 21 layers of nanowire array layer is prepared. When transferred, the nanowires in adjacent layers are orthogonal to each other by rotating the layer to be transferred by 90° from the just previously transfer direction. To enhance the interlayer bonding and crystallinity of the electrode stacked and assembled, heat treatment is performed at 400° C. under an atmosphere of Ar for one hour.

Figure 5:
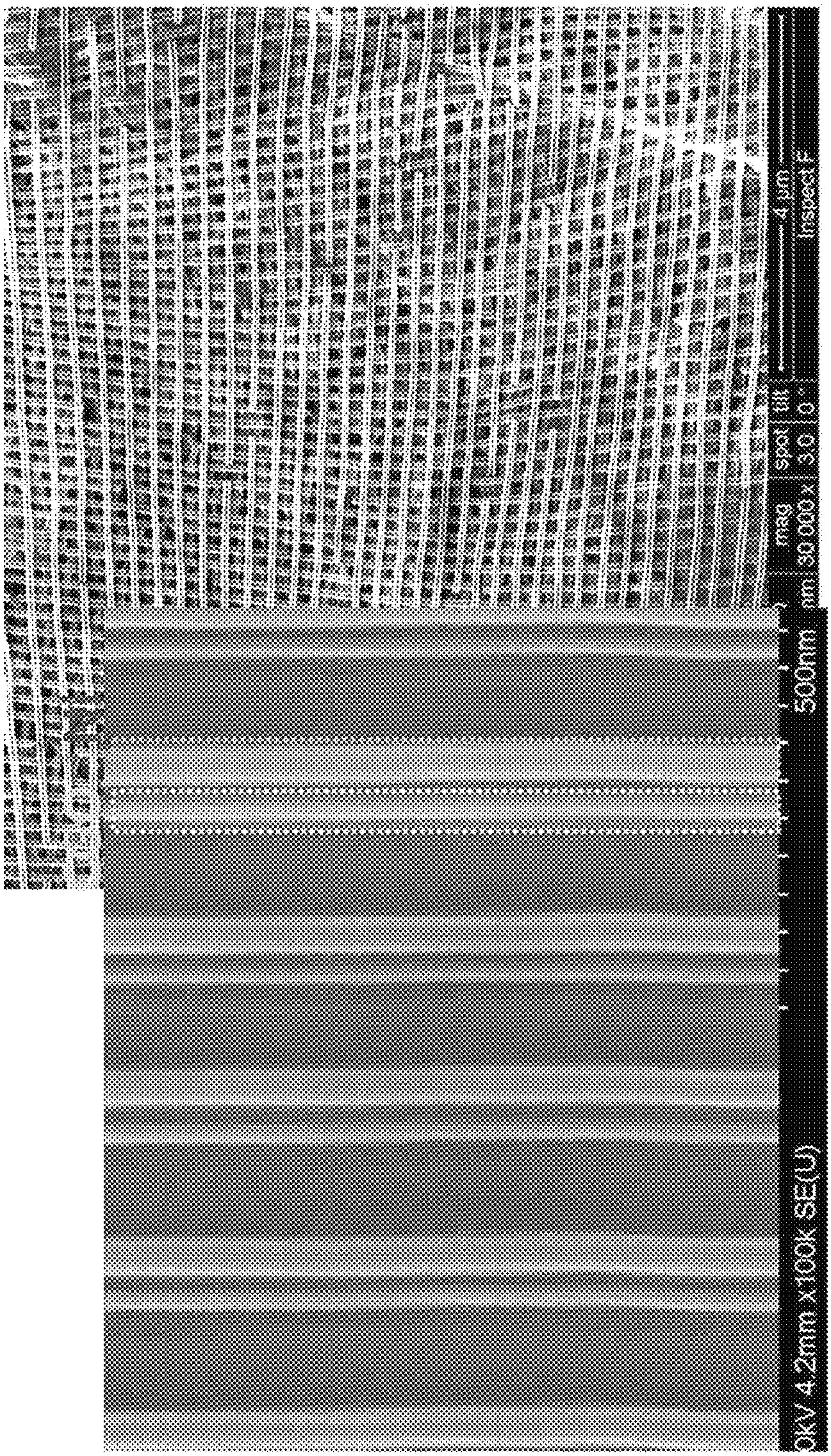
FIG. 5 is a scanning electron microscope (SEM) photograph of an electrode according to Example 1.

FIG. 5 is an SEM photograph of the anode according to Example 1, with the stacked structure viewed from above. The manufactured electrode is a 21-layer stacked structure of CGO/Ni/Air nanowire array, in which CGO is spatially expanded in a perfectly controlled manner to form an interface with Ni and Air. In one layer, a thickness (height of the nanowire cross-section) of CGO and Ni nanowires is 30 nm and a length of the nanowires is approximately 2 cm. A linewidth (cross-sectional length; diameter) of Ni nanowire is 50 nm, a linewidth of CGO nanowire is 30 nm, and an interval between Ni nanowire and CGO nanowire is approximately 0 nm to 10 nm, and a width (diameter) of the air gap between the first nanowire and the second nanowire is 110 nm, resulting in a pattern with a total period of 200 nm.

In one layer, 1000 TPBs per square micrometer are formed when the nanowire array has a 200 nm period. Assuming the interface to be straight, a three-phase interface of 160 μm is formed in a volume of 0.63 $\mu m^3$. Eventually, the TPB density is calculated to be a high value of 253.97 $\mu m/\mu m^3$. It can be seen that the formation of TPB of the example above is a dramatic increase compared to a conventional powder process, where 10 TPB or less per micrometer is formed, and a conventional thin film process, where 50 TPB or less per micrometer is formed.

Example 2: Manufacturing Solid Oxide Fuel Cell (1) Manufacturing of Cathode

Figure 6:
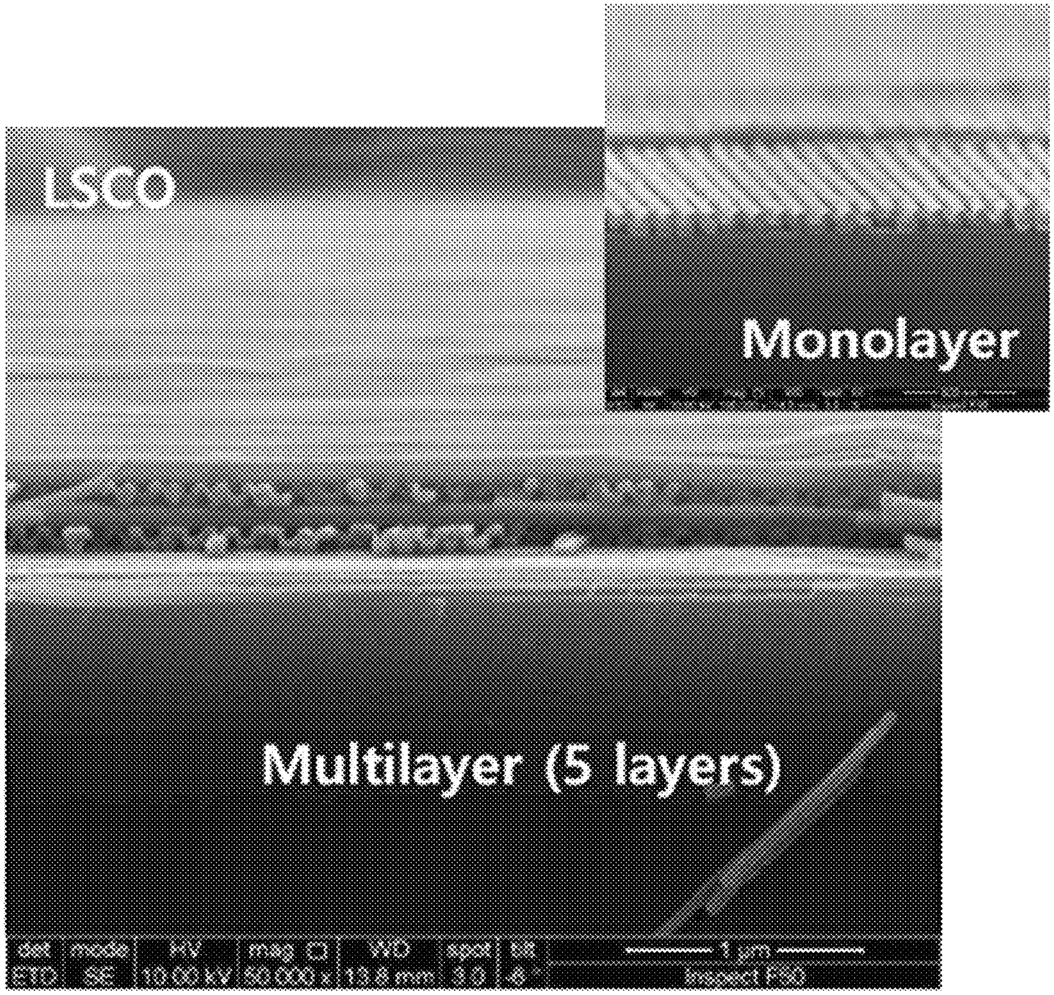
FIG. 6 is an SEM photograph of a cathode for a solid oxide fuel cell according to Example 2.

A trench substrate with the concave-convex surface in which straight columns with a width of 50 nm are arranged at 100 nm periodic intervals is prepared, and a top surface of the substrate is surface-treated with PDMS. The PMMA is spin-coated on top of the surface-treated substrate, and then adhesive tape is applied and peeled off to produce a PMMA thin film with an inverse structure of the concave-convex. Using this PMMA as a substrate, La—Sr—Co oxide (LSCO) is deposited at 20 nm using an e-beam evaporator and then transferred in 40 layers onto a silicon wafer. When transferred, the layer to be transferred is rotated by 90° so that the bone of the just previously transferred layer is orthogonal to the bone of the layer to be transferred. The cathode is manufactured by heat treatment of the prepared structure at 750° C. for 12 hours in an atmospheric atmosphere. FIG. 6 is an SEM image taken during the manufacturing process of the cathode according to Example 2, illustrating a side view of a monolayer structure (top right) and a five-layer stacked structure.

(2) Manufacturing Electrolyte

Using the heat treated cathode as a substrate, a CGO/YSZ/CGO (250 nm/100 nm/1000 nm) thin film is deposited using a sputter to form an electrolyte.

(3) Manufacturing Anode

Figure 7:
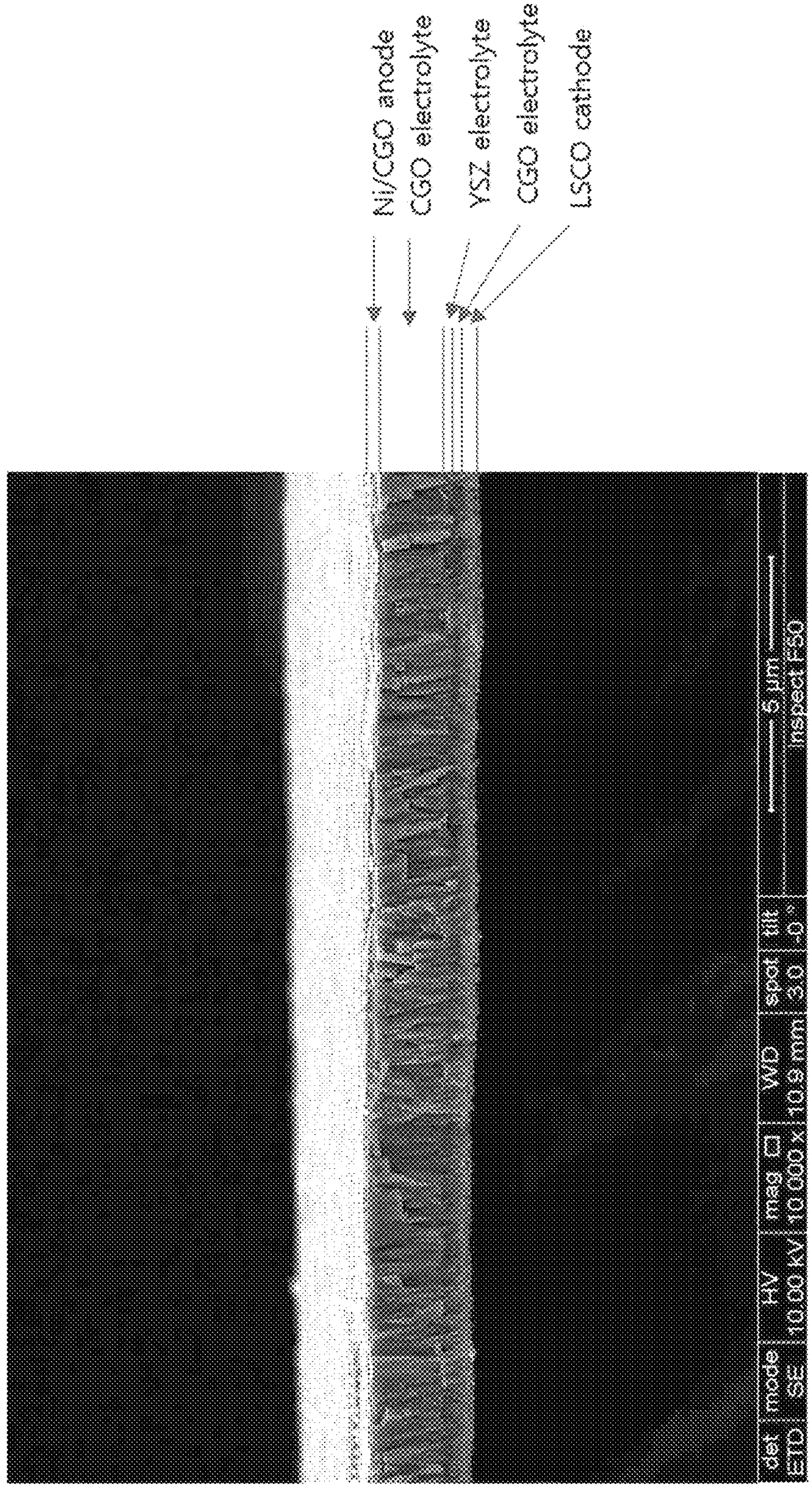
FIG. 7 is an SEM image taken from a side surface of the solid oxide fuel cell manufactured in Example 2.

Using the electrode manufactured in Example 1 as an anode, the anode is formed on the electrolyte thin film. In this method, the solid oxide fuel cell with cathode-electrolyte-anode stacked is manufactured. FIG. 7 is an SEM image taken from the side surface of the solid oxide fuel cell manufactured. With reference to FIG. 7, it can be seen that the CGO/YSZ/CGO electrolyte is positioned on the bottom LSCO cathode, and the Ni/CGO anode is stacked on top of the electrolyte.

While the above preferred embodiments have been described in detail, the scope of the present disclosure is not limited thereto, and various modifications and improvements by those skilled in the art using the basic concepts defined in the following claims are also within the scope of the present disclosure.

What is claimed is:

1. An electrode with a three-dimensional structure comprising two or more layers of nanowire array layer in which first and second nanowires of different materials, and air gaps between the first nanowires and the second nanowires, are arranged side by side, wherein nanowires in one layer are crossed by nanowires in an adjacent layer, and wherein a density of a contact point, which is a triple-phase boundary (TPB), at which gas or liquid simultaneously encounters the first nanowire and the second nanowire in the electrode with the three-dimensional structure is 100 $\mu m/\mu m^3$ or greater.

2. The electrode of claim 1, wherein the nanowires in one layer form an angle of 45° to 90° with the nanowires in an upper adjacent layer and/or a lower adjacent layer.

3. The electrode of claim 1, wherein each of the first nanowire and the second nanowire has a diameter of 3 nm to 100 nm.

4. The electrode of claim 1, wherein the air gap between the first nanowire and the second nanowire has a width of 1 nm to 10 μm.

5. The electrode of claim 1, wherein each of the first nanowire, and the second nanowire has a length of 0.5 mm to 50 cm.

6. The electrode of claim 1, wherein the nanowire array layers are stacked in 2 to 500 layers.

7. The electrode of claim 1, wherein the first nanowire, the second nanowire, and an air gap therebetween are sequentially and repeatedly arranged in a regular manner in one nanowire array layer.

8. The electrode of claim 1, wherein the first nanowire, an air gap, the second nanowire, and an air gap are sequentially and repeatedly arranged in a regular manner in one nanowire array layer.

9. The electrode of claim 1, wherein the nanowire array layers are stacked in five or more layers, and wherein the air gap between the first nanowire and the second nanowire has an increasingly larger width as the nanowire array layer is stacked from a lower layer to an upper layer.

10. The electrode of claim 1, wherein the first nanowire and the second nanowire each independently comprise a metal, a semi-metal, a metal oxide, a semi-metal oxide, a carbon material, a polymeric compound, a composite thereof, or a combination thereof.

11. The electrode of claim 1, wherein the first nanowire comprises an electrode material and the second nanowire comprises an electrolyte material.

12. A method of manufacturing an electrode comprising:

preparing a patterned substrate having a shape arranged with rectangular columns lying side by side;

depositing a first material while tilting the patterned substrate at an inclined angle of 60° to 85° and depositing the first material on one edge of convex columns;

depositing a second material by rotating the patterned substrate on which the first material is deposited by an angle of 180° and depositing the second material on the other edge of the convex columns; and attaching a flat plate to a portion on which the first material and the second material are deposited, and removing the patterned substrate to obtain a nanowire array layer in which the first nanowire composed of a first material, the second nanowire composed of a second material, and an air gap between the first nanowire and the second nanowire are arranged side by side.

13. The method of claim 12, wherein in the patterned substrate, a width of the convex column is 5 nm to 500 μm, an interval between the convex column is 5 nm to 500 μm, and a length of the convex column is 0.5 mm to 50 cm.

14. The method of claim 12, wherein the patterned substrate comprises an acrylic resin.

15. The method of claim 12, wherein the removing of the patterned substrate is by contacting the patterned substrate with an organic solvent or vapor of the organic solvent.

16. The method of claim 12, wherein the first material and the second material are different from each other and each independently comprises a metal, a semi-metal, a metal oxide, a semi-metal oxide, a carbon material, a polymeric compound, a composite thereof, or a combination thereof.

17. The method of claim 12, wherein the first material is an electrode material and the second material is an electrolyte material.

18. The method of claim 12, further comprising:

cross-stacking the nanowire array layers to obtain the electrode with the three-dimensional structure in which the nanowire array layers are stacked in two or more layers.

19. The method of claim 18, wherein in the electrode with the three-dimensional structure, the nanowire array layers are stacked in 2 to 500 layers, and the nanowires in one layer form an angle of 45° to 90° with the nanowires in an upper adjacent layer and/or a lower adjacent layer.

20. The method of claim 18, wherein the nanowire array layers are stacked in five or more layers, and wherein a width of the convex columns or an interval between the convex columns are different for each layer, so that the air gap between the first nanowire and the second nanowire has an increasingly larger width as the nanowire array layers are stacked from a lower layer to an upper layer.

* * * * *